United States Patent Office.

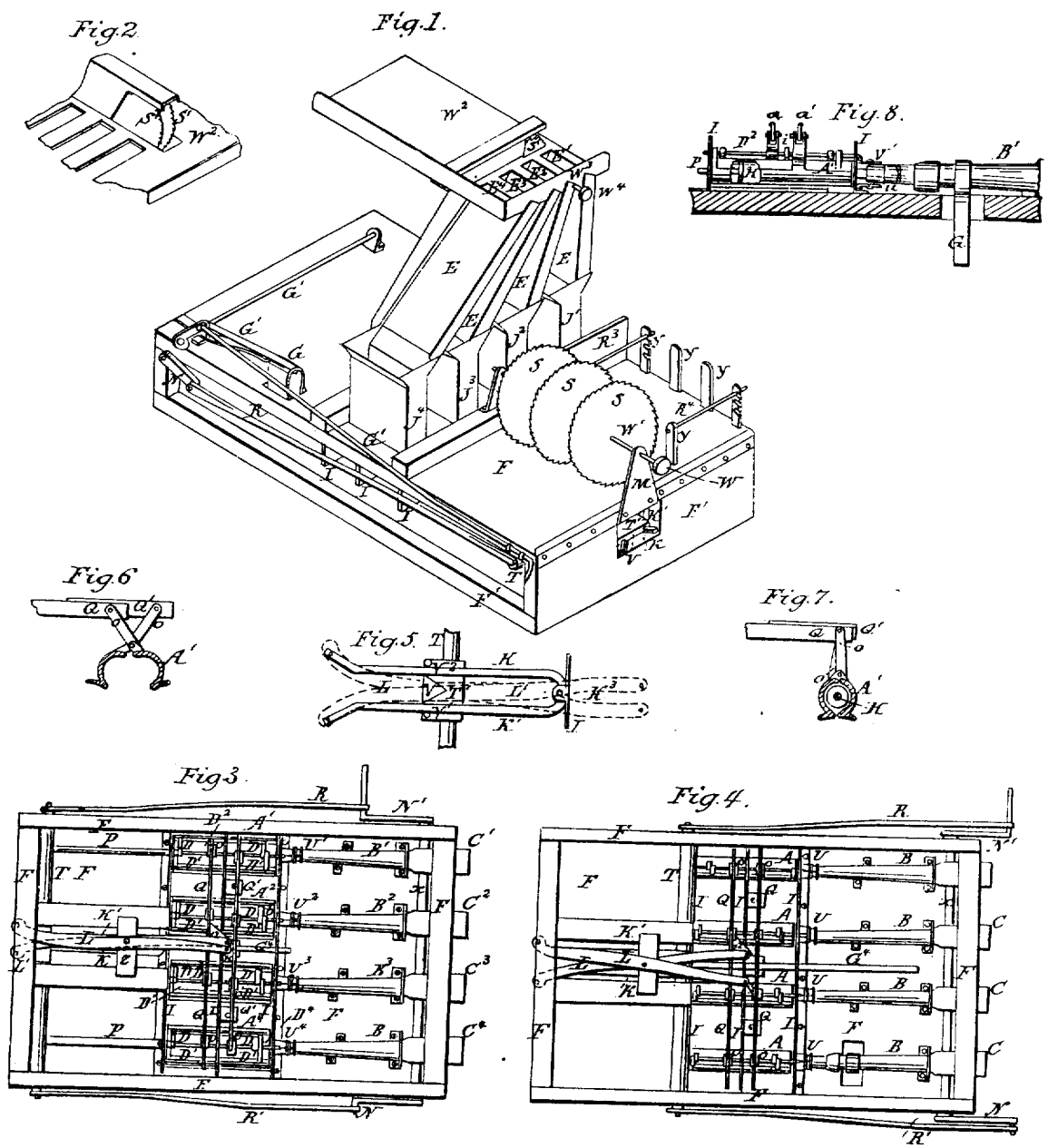
EAGLE & GOODWIN.
Cane-Stripper.
No. 69,551. Patented Oct. 8, 1867.

ROBERT N. EAGLE AND WILLIAM F. GOODWIN, OF WASHINGTON, DISTRICT OF COLUMBIA, ASSIGNORS TO THEMSELVES AND WILLIAM DUANE WILSON, OF DES MOINES, IOWA.

*Letters Patent No. 69,551, dated October 8, 1867; antedated September 25, 1867.*

IMPROVEMENT IN MACHINE FOR SEPARATING THE EXTERIOR OR BARK FROM THE INTERIOR OR PITH OF SORGHUM AND OTHER PLANTS.

*The Schedule referred to in these Letters Patent and making part of the same.*

TO ALL WHOM IT MAY CONCERN:

Be it known that we, ROBERT N. EAGLE and WILLIAM F. GOODWIN, both of the city of Washington, county of Washington, and District of Columbia, have invented a new and useful Apparatus for Separating the Bark or Exterior from the Pith or Interior Parts of Sorgo and other Stalks or Canes; and we do hereby declare the following to be a full description of the same, reference being had to the accompanying drawings, which are made part of this specification, and in which—

Figure 1 represents a perspective view of a separating machine, as seen when set up and ready for use.

This view shows the outside of the frame F and the cutting apparatus attached to it, and the means by which the cane is conducted from the saws or cutters S' to the peeling or separating apparatus, which is attached to the under side of the platform or frame F, as shown in Figures 3 and 4.

We will now describe the cutting apparatus, and afterwards the separating apparatus.

$W^2$ represents a platform or table on which the stalks of cane are laid, to be at hand for the operator, who stands in front of the saws. S' S' represent two saws placed on the shaft $W^3$, at a distance asunder sufficient to permit the joint of the cane to pass between them, which would be about one-half inch, as shown in fig. 2, the object of the saws S' S' being to cut the joints out of the stalks, at the same time cutting the stalks up in suitable lengths to permit them to pass through the separators. $W^4$ represents the pulley by which the shaft $W^3$ and saws are operated. Letter E represents the openings in the top of the table $W^2$ and the troughs through which the pieces of cane pass into the barrels. The openings are of different widths, and are numbered respectively 1, 2, 3, 4, No. 1 being the smallest and No. 4 the largest, the width of each opening corresponding with the width of its hopper, J, of the same number, and with the diameter of the bore of the barrel of a corresponding number, into which the pieces of cane which pass through the opening are conducted by means of its trough E and hopper J, each of the openings having a corresponding barrel and tube. Thus the pieces of cane of the least diameter pass through the small opening E', small hopper J', and small barrel A', while the bark passes over and the pith passes through the small tube B', (see figs. 3 and 4;) this arrangement of the openings, barrels, and tubes, of different diameters and sizes, being necessary to adapt them to the various dimensions of the stalks of cane, which vary in size, the butts being larger than the tops, a piece of cane that will pass through the opening will pass through the hopper and barrel of corresponding numbers, the openings serving as gauges.

The arrangement of the saws S', for cutting the joints out of the stalks, may be used before the pith is separated from the bark, or after, as may be desired. If used to cut the joints from the pith after the bark has been removed the saws S' and platform $W^2$ can be placed near to where the pith is delivered from the machine, to have the pith more conveniently at hand.

Letters J represent hoppers, arranged to stand vertically over the barrels A, each hopper standing over the barrel of a corresponding number. The barrels when shut serve as bottoms for the hoppers. When the barrels are open one piece of cane falls into the bore of each; when the barrels shut each encloses a piece of cane, and serves to hold up the pieces remaining in the hoppers.

B O X represent a box or platform, having one end board, and having the posts Y for its sides, one end being left open to permit the tops of the cane to protrude. This arrangement is for the purpose of confining the cane in bales or bundles, to be cut in pieces by the saws S. When the box is filled with cane the butts of the stalks are placed against the end board, which brings them all even, the tops protruding through the open end, between the posts Y. When the box is full to the top of the posts Y the bars or levers $R^3$ and $R^4$ are brought down over the cane, thus confining it. As many bars may be used for compressing the cane as may be found necessary, and the box may be made of any required size and shape to accomplish the same purpose Letters S S S represent three saws, arranged on the shaft $W^1$, and operated by the pulley W.

M M represent the posts which support the shaft $W^1$ on which the saws S are mounted. The saws are arranged on the shaft at such equal distances asunder as may be required to cut the cane in suitable lengths to pass through the machine. As many saws may be used, to cut the stalks of cane into as many pieces as may be required. When the cane is compressed into a tight bale in the box, the saws being in operation, the box is moved under the shaft W¹, the stalks of cane lying parallel with the shaft W¹ and at right angles with the saws S; the saws cut through the bale, passing between the posts Y, thus cutting the stalks in pieces.

When this apparatus is used for cutting the stalks, preparatory to passing through the separators, the troughs E are used in connection with it to conduct the pieces of cane of different sizes to the hoppers suited to their respective diameters, the stalks being divided by the saws into lengths or cuts, the diameter of the pieces of each cut differing from the other. The cuts are kept separate from each other. The stalks of the butt cut, being of the largest diameters, pass through the largest hopper J, barrel A, and tube B, No. 4; the cut next to the butt, being of the next largest diameter, passes through the hopper, barrel, and tube No. 3; and the next cut through the next size, No. 2; and the smallest (the top cut) through No. 1.

The cutting apparatus may be placed in any position in relation to the separators that in practice is found to be most convenient.

Having thus described the cutting apparatus, we will now describe the construction and operation of the separating apparatus.

Figure 3 is a view of the under side of the platform or frame F, having the separating apparatus attached, showing a bottom or under side view of the separating apparatus, and the manner in which it is attached to the frame, and also the position of the apparatus when the barrels A are open.

Figure 4 is a similar view of the same, showing the position of the apparatus when the barrels are closed.

Figures 5, 6, 7, and 8 are detached views of parts of the same apparatus, and will be referred to in the following description.

In fig. 3, the small numbers, 1, 2, 3, and 4, indicate barrels, tubes, and collars of different interior dimensions, No. 1 being the smallest, No. 2 the next, No. 3 the next, and No. 4 the largest, thus providing for the various sizes of the cane.

Letter A represents a barrel made of two concavo-convex pieces of metal, having lugs D and D' and handles O and O' on the under sides, by which the pieces are hinged together, a bolt, D², passing through corresponding holes in the lugs and handles and through the plates I, thus forming the pivot or hinge on which the two side pieces swing, and by which the barrel is held in place between the plates I. The barrel may be made of tube, sawed lengthwise through the middle, dividing the tube into two equal parts and riveting the lugs and handles on to the pieces, or by casting the two side pieces separately, with lugs and handle on each, and clamping them together, and boring a hole lengthwise through the centre, half the hole or cavity in each piece making the bore sufficiently large and the barrel sufficiently long to receive cane of a certain diameter and length. While the barrel is in the clamps the holes in the lugs and handles should be bored for the bolt D². The handles O and O' are for the purpose of operating the sides of the barrel, causing the barrel to open and shut to receive and enclose the cane.

Q and Q' represent bars which lie parallel with each other, and at right angles with the barrels and bolts D², extending across and operating all the barrels by means of the handles O and O', to which the bars are pivoted or hinged, (see figs. 6 and 7.) The bar marked Q, being pivoted or hinged to the handles marked O, serves to operate that side of all the barrels to which the handles O are attached. The bar Q', being attached to the handles O', serves to operate that side of the barrel to which the handles O' are attached.

The plates or boards I are attached securely to the under side of the platform or frame F. The ends of the bolts D² pass into or through the plates I, which serve to hold the barrels in place, and thus attach them to the frame F.

L and L' are levers, both pivoted near their middle to the plate Z on one pivot. One end of the lever L is attached or pivoted to the projection I' on the bar Q', and the other end is pivoted to the swinging end of the arm K¹. The lever marked L' is pivoted or hinged to the projection I² on the bar Q, at one end, and at the other to the swinging end of the arm K.

K and K' are arms of similar construction, the inner ends being bent to meet each other, and hinged together and to the projection K³ on the plate I, (see fig. 5,) the swinging or outer ends being bent from each other in the form of the letter V. When the arms are opened by the wedge V the inside and outside edges are parallel with each other, and are held in that position by the wedge V and pins V¹ and V². The wedge moving between the arms holds them apart, and the pins V¹ and V² moving on the outside holds them together, thus holding the arms in a position parallel to each other, holding the swinging ends of the arms asunder, which spreads the ends of the levers L and L', the ends of which, being attached by pivots to the bars Q and Q', serve to close and hold the barrels shut, (see figs. 4 and 5.)

T' is a plate fastened to the middle and on the under side of the cross-head T. The wedge V and pins V¹ and V² are fastened to the plate T', (see fig. 5.) When the cross-head T is moved out to the end of the frame it carries the wedge V and pins V¹ and V² with it. The pins, bearing against the outside of the bent-out ends of the arms K and K', force them together. The wide end of the wedge V, having moved out from between the straight edges of the arms, and being between the bent ends of the arms, permits the ends to come together at their bends, the wedge V resting between the bent ends of the arms until the motion of the cranks reverses, (see fig. 7.) When the arms are in this position the ends of the levers L and L' are brought together, and the barrels are open, (see figs. 3 and 6.)

Letter P represents piston-rods, one for each barrel. The piston-rods P are fastened at one end to the cross-head T, and, passing through holes in the plates I into the barrels, carry on their other end the piston-head H, the diameter of each of which corresponds with the diameter of the bore or chamber of the barrel in which it works, (see fig. 8.)

G' represents a guide-rod attached at one end to the cross-head T, and working through holes in the plates I.

I I I represent three plates or pieces of thin metal, or boards of wood, placed transversely to the barrels and tubes, and secured by their edges to the under side of the platform F, and serve as means of attachment for the barrels A, and collars U, and arms K and K'. R and R' represent connecting-rods or pitmen, which connect the cross-head T with the cranks N and N', and by which motion is imparted from the cranks N and N' to the cross-head T, and through the cross-head T to the pistons P and arms K and K', and through the arms to the levers L and L', and through the levers to the bars Q and Q', and through the bars Q and Q' and handles O and O' to the barrels A.

X is a shaft, having its journals in the sides of the frame F, and supports and gives motion to the cranks N and N'. U is a short yielding tube, composed of separate pieces hinged by one end to the plate I, around the hole in the plate leading from the bore or chamber of the barrel to the separating tube B. The loose or yielding ends, being held together by the elastic spring $u$, lie close to and around the neck of the separating tube, thus forming a close-fitting and yielding collar, which serves to guide the end of the cane to and centre it on the end of the separating tube. When the tube enters between the bark and pith of the cane the collar yields, and permits the bark, with its joints, husks, and inequalities, to pass out around the outside of the tube, the pith passing out through the tube.

Letter B represents a tube of conical shape, the outer end being larger than the inner end. A circular knife, made of steel, is welded on or attached to the small end of the tube, (see fig. 8,) and serves as a cutter, to separate the bark from the pith of the cane when the stalk is in the act of passing out of the barrel.

$B^1$ $B^2$ $B^3$ and $B^4$ represent the tubes B of different diameters, the diameter and size of each corresponding with that of the bore or chamber of the barrel of the same number. The tubes are fastened to the under side of the platform F, in line with the barrels A. The small sharp ends of the tubes being presented to the bore or chamber of the barrels are enclosed in the collars U. The axes of the bore or chamber of the barrels A and tubes B, being the same, are in line and parallel with each other. The tubes B may be made of metal of any suitable kind, or of wood, having steel rings for the separating knives fastened on the small ends. The small sharp end of the circular knife or separator on the end of the tube B should be made about the thickness of the bark of the cane, smaller in circumference than the bore or chamber of the barrel with which it is connected.

Letters C represent spouts which serve to conduct the pith to the outside of the division-board, which serves to keep the pith separate from the bark. The spouts may be made of any required length, size, and shape. Letter G represents a device for throwing the bark and husks from the tube B.

Having thus described the construction and functions of the several parts of the apparatus in detail, we will now proceed to describe the operation of the same in connection with each other.

When the machine is in motion and the cane passing through it, the hoppers being filled with pieces of cane, which pieces lie one on top of the other, the weight of the top pieces serving to force the under piece down into the bore or chamber of the barrel when the barrel opens to receive it, the machine being in motion, the cranks turning inward towards the cross-head T, act upon the pitmen R and R', which shoves the cross-head T outwards to the end of the frame F. The wedge V attached to the cross-head T moves with it. When the cross-head T has reached its farthest point in its outward movement, the wedge V having drawn out from between the parallel sides of the arms K and K', the pins $V^1$ and $V^2$ having drawn the ends of the arms together, the ends of the arms, being pivoted to the ends of the levers L and L', force the ends of the levers together, the inner ends of the levers being pivoted to and acting upon the bars Q and Q', which, being pivoted to, act upon the handles O and O', thus opening the barrels to receive the cane, (see figs. 5 and 6.) The piston-rods P, being attached to the cross-head T, are drawn out of the barrels. Having drawn the piston-heads H to the ends of the chambers, and from under the openings in the bottom of the hoppers J, the barrels, being longer than the hoppers, permit the piston-heads H to draw from under the openings, thus permitting the cane to fall into the bore or chamber of the barrels, in front of the piston-heads H. Figs. 3 and 6 show the position of the apparatus when the barrels are open. When the cranks reverse, moving outward, drawing the cross-head T towards the barrels A, the wedge V moving in between the ends of the arms K and K' forces them asunder, and, sliding in and out between the arms, holds them open, (see fig. 5.) The arms, acting on the levers, bars, and handles, as before described, close the barrels, and hold them together until the cane is punched out and the piston-heads H are drawn back from under the hoppers, (see figs. 4, 5, and 7.) When the piston-heads H have passed from under the openings in the hoppers J the pins $V^1$ and $V^2$ strike the bent ends of the arms K and K', forcing them together, and the barrel again opens to receive the cane, as before explained, and shown in figs. 3 and 6.

The stalks of cane being enclosed within the barrels A, lying lengthwise in the chambers, the piston-heads H, moving against the ends of the stalks, shove them endwise out of the barrels. The small ends of the tubes B, being opposite to the bore or mouth of the chambers, and being smaller than the ends of the cane, enter under the bark and cut it loose from the pith. While the cane is passing out of the barrels the bark passes over the outside of the tubes and falls down on the inside of the division-board, which is the end board of the frame F, and the pith passes through the tube B and spouts C, and falls down into a trough on the outside of the division-board; which arrangement separates and keeps the pith separated from the bark. The cross-head T, in its outward movement, strikes the bent-down end of the rod G', thus operating the spring-fork or spreader G, which serves to cast the bark and husks from the tube B, (see figs. 1 and 8.)

The design of this invention is to remove the pith from the bark or wood of canes or stalks of any kind or description which require the separation of the pith from the bark preparatory to their use, but more especially for removing and separating the bark or exterior parts from the pith of sugar-canes before extracting the juice, thus removing all the nauseousness and acidity which the bark contains, and thus effectually separating the nauseous juices contained in the bark from the sweet and pure juice of the pith before their having become mixed.

Having thus described our invention, what we claim as new, and desire to secure by Letters Patent, is—

1. A barrel or case adapted to receive and enclose the stalk or cane, for the purpose of effecting a separation of the bark or woody substance from the pith or interior.

2. A tube or tubes, provided with a sharp edge or annular knife on the small end, which enters the cane between the bark and the pith, thus separating the bark or exterior from the pith or interior parts of stalks or canes, constructed as described, and operated in any manner or by any means whereby the tube can be made to accomplish the purpose set forth.

3. A yielding tube or collar, U, hinged or attached to the plate I, or its equivalent, around the hole or mouth of the chamber of the barrel A, at one end, and held together by the spring $u$, or its equivalent, at the other end, and which collar encloses and hugs the small end of the tube B, thus forming a conductor which guides the end of the cane to and centres it on the end of the tube B, constructed and arranged to operate in the manner and for the purpose substantially as described.

4. The piston or pistons H, with the rod or rods P, which operate in the chamber or chambers of the barrel or cases A, and serve to discharge the cane from the same, arranged to operate in the manner and for the purpose substantially as described.

5. The handles O and O', bars Q and Q', levers L and L', arms K and K$^1$, wedge V, and pins V$^1$ and V$^2$, and plate T', constructed and arranged to operate in the manner and for the purpose substantially as described.

6. The cross-head T, guide-rod G$^4$, bars or pitmen R and R$^1$, cranks N and N', and shaft X, arranged to operate in the manner and for the purpose substantially as described.

7. The plates I I I, which serve as a means of attachment for the barrels A and collar U, and being securely attached to the under side of the platform F, serve to hold the barrels and collars in their places, arranged in the manner and for the purpose described.

8. The hopper or hoppers J and trough or troughs E, constructed and arranged in the manner and for the purpose set forth.

9. The saws S' S', shaft W$^3$, pulley W$^1$, and platform W$^2$, constructed as described, and arranged to operate in the manner and for the purpose set forth.

10. The saws S S S, shaft W$^1$, and box B O X, constructed and arranged to operate in the manner and for the purpose described.

11. The platform or frame F, to which the several parts of the apparatus are attached, arranged in the manner and for the purpose set forth.

12. The fork or spreader G, for the purpose set forth.

R. N. EAGLE,
WM. F. GOODWIN.

Witnesses:
   W. W. JOHNSON,
   H. J. PLYE.